Jan. 13, 1970   TOSHIO SUGIZAKI ET AL   3,489,118
METHOD OF CONSTRUCTION OF HULL AND EQUIPMENT THEREFOR
Filed March 6, 1968   2 Sheets-Sheet 1

INVENTORS
Toshio Sugizaki
Ko Ogarashi
Ichiro Inui
BY Michael S. Striker
ATTORNEY Jan. 13, 1970 TOSHIO SUGIZAKI ET AL 3,489,118
METHOD OF CONSTRUCTION OF HULL AND EQUIPMENT THEREFOR
Filed March 6, 1968 2 Sheets-Sheet 2
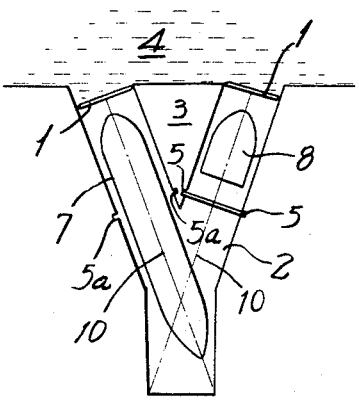
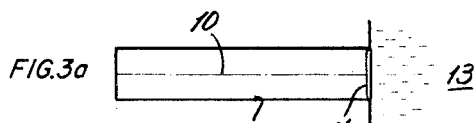
FIG. 3a
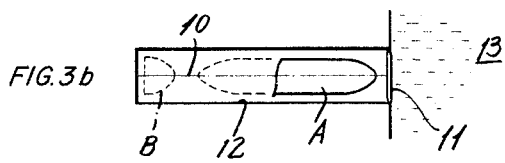
FIG. 3b
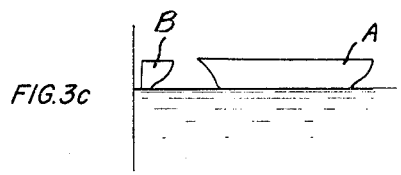
FIG. 3c
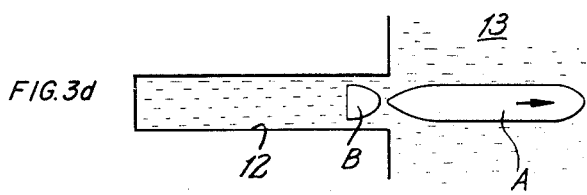
FIG. 3d
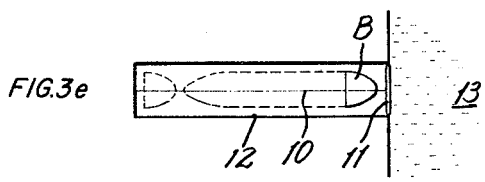
FIG. 3e
INVENTORS
Toshio Sugizaki
Ko Igaroshi
Ichiro Inui
BY Michael S. Striker
ATTORNEY

United States Patent Office 3,489,118
Patented Jan. 13, 1970

3,489,118
METHOD OF CONSTRUCTION OF HULL AND EQUIPMENT THEREFOR
Toshio Sugizaki, Ko Igarashi, and Ichiro Inui, Yokohama-shi, Japan, assignors to Nippon Kokan Kabushiki Kaisha, Tokyo, Japan
Filed Mar. 6, 1968, Ser. No. 710,914
Claims priority, application Japan, Mar. 9, 1967, 42/14,444
Int. Cl. B63b 3/02
U.S. Cl. 114—65          5 Claims

ABSTRACT OF THE DISCLOSURE

A method and a ship-yard basin for hull construction. The basin is elongated and has opposite open ends each of which communicates with a body of water, and each of which is normally closed to prevent the entry of water. Partitioning means is provided subdividing the elongated enclosure into at least two compartments which, by moving the partitioning means, can be changed in that one compartment is made larger and the other simultaneously made smaller, or vice versa. In each of the sections a hull is being constructed, and because construction is begun on the hulls at different times normally, one will be finished before the other. The section containing the finished hull is then flooded by opening its end communicating with the body of water, and the finished hull is floated out into the body of water. Now the section is closed again and the water evacuated whereupon construction of a new hull can be started in this section. During the flooding and subsequent evacuation work on the other hull in the other section can continue uninterruptedly because this section is water-tightly sealed off from the flooded one.

---

This invention relates to a method of construction of hull and equipment therefor, particularly a method of constructing of hulls advantageously according to the so-called semitandem construction method, and equipment for carrying out said method. The present invention also relates to a dock.

For constructing a hull, there is a so-called semitandem method. In a ship, an engine room section requires more works than other sections. The construction of this section takes a very long time. In the construction of ships, if work on the respective sections is started at the same time, it takes inevitably longer to complete a stern section so that the period of construction of a whole ship in a large dock also must extend for a long time. In order to reduce the construction time so as to utilize the dock effectively, the dock is built appropriately longer than a hull to be constructed. In such a dock, the hull of one ship is constructed in one part of the dock and at the same time the stern section including the engine room of another ship is constructed in the remainder of the dock. Thus when the hull of the one ship is completed, the construction work on the stern section of the other ship is in process. Such a construction method is called the semi-tandem system which intends to reduce the period of hull construction and utilize a dock effectively.

For constructing a hull according to said semitandem system, a method is known according to which a dry dock having one end facing a water region is made a little longer than a hull to be constructed. In the greater part of the dock closer to the water region a hull is constructed with its stern portion facing the water region. At the same time, in the portion of the dock remote from the water region, the stern hull of the next ship is constructed with its stern portion directed toward the water region. When the whole hull and the stern hull are both completed, water is let into the dock so as to float both hulls which are then moved in the direction of the water region until the whole hull is located outside the dock and the stern hull occupies the former position of the whole hull. Then the water is drained from the dock and the stern hull is settled. Construction now proceeds on the stern hull to convert it into a whole hull and a new stern hull is started in the position formerly occupied by the preceding stern hull.

However, although the above semitandem system is truly useful for effective utilization of the dock and reduction of hull construction times it has disadvantages.

All construction is stopped when the stern hull is floated and moved. This leaves many of the workers temporarily idle.

Floating works and operations of the stern hull are very complicated and difficult, because the stern hull is not naturally formed in itself for effective and stabilized floating. Its external configuration is complicated and the positions of buoyancy and gravity do not agree with each other. Moreover in floating and moving such a stern hull, it is necessary to keep it horizontal. For this, a special watertight partition is required in a part of the stern hull so as to keep it horizontal by water pumped into said portion. Needless to say, the mere engine room does not suffice to keep the stern hull horizontal. To this end it is necessary to construct the stern hull leaving a portion of appropriate length in the direction of the bow, in connection with the engine room section. If constructed without buoyancy calculation, it cannot be floated and moved. Further when the stern hull thus floated and moved is settled at a position facing the water region, the water tight partition must be converted to non-watertight condition. The above stated series of floating operations is evidently very complicated. Moreover it is technically easily understandable that the maintenance of watertightness and horizontality of the stern hull is accompanied by serious difficulties. The moving of the stern hull is not easy.

The above-stated stern hull is evidently not desirably shaped for moving afloat. For moving the stern hull to the position facing the water region of dock, means such as wire reels and a tugboat are required. Moreover in order to settle the hull thus moved, to the position of displacement, the hull must be accurately agreed with center line of dock. Since the hull is constructed in agreement with center line provided to dock, the hull which was moved and settled at a predetermined position should essentially be agreed with center line of dock for continuing subsequent works. Inasmuch as the settling of hull in agreement with center line of dock is carried out in floating state, this operation is difficult. Simultaneous completion of work on both hulls in the dock cannot be expected.

The completion of the hull does not always agree with that of the stern hull of next ship, aligned. Moreover said stern hull should be tested again after all watertight works under water line are completed. Accordingly although it is said that a reduction of work time and an effective utilization of the dock can be expected, these advantages can not be obtained substantially in full.

The present invention has succeeded to avoid the above disadvantages of hull construction according to prior semitandem system effectively. Namely the fundamental object of the present invention is to keep stern hull of next ship from floating and moving at the time of construction hull according to prior semitandem system. As above stated, in the construction of hulls according to the semitandem system the troublesomeness of floating and movement of the stern hull of the next ship much reduces the advantages of reduction in work time and effective utilization of the dock. The present invention eliminates such floating and movement of stern hull. To this end, an intermediate gate is provided between the area for construction of preceding hull and the area for construction of stern hull of next ship in dock so as to constitute a dry state also in the latter area while a preceding hull is afloat. This enables to achieve the construction of hull according to semitandem system smoothly. Namely the present invention completely eliminates wire reel, tugboat and other moving operation, and operation of settling stern hull thus floated and moved, again in exact agreement with center line of bottom of dock so that the construction of hull can be made advantageously.

Another important object of the present invention is to maximize the above reduction of term of work of hull construction according to the semitandem system and the above effective utilization of dock. A further object of the invention is to make the construction operations on the full hull and the stern hull which are being simultaneously constructed in the same dock, independent of each other.

An additional object of the invention is to provide a relatively simple dock for carrying out the present method, and to enable the hull construction to proceed with lesser requirements for the introduction and drainage of water. In accordance with these objects a land area is selected having water regions on both sides. In such an area, gates are provided respectively in the portions facing the water regions of both sides. At respective positions in the proximity of the gates there are formed gate arrangement portions in which intermediate gates are provided mountably and dismountably. Between the gate facing one water region of the dock and the intermediate gate provided on the gate side facing the other water region, the full hull is constructed. Between said intermediate gate and the gate facing the other water region, the stern hull of the next ship is constructed. When the construction of preceding hull is completed, the gate facing the one water region is opened, so as to connect the dock portion containing the full hull with the outer water region, thereby launching said full hull in completion. After the full hull has left the dock, said gate facing said one water region is closed and the construction of stern hull on the side of the gate facing the other water region is continued until its conversion into a full hull. In the dock portion evacuated by the completed full hull, the construction of the stern hull of the next ship is begun. After conversion of the earlier stern hull into a full hull is completed, the gate facing the other water region is opened, thereby launching this new full hull. Thus hulls constructed in sequence are launched alternately toward opposite water regions. In this way the floating and movement of the stern hulls, stoppage of work, provision of special watertight partition, watertight work and tests of said work, all for floating and movement of the stern hull, can be completely eliminated. Moreover, full hulls constructed one after another are launched in sequence without being hindered by the stern hull of the next ship. Thus the reduction of work time of hull construction and the effective utilization of dock can be obtained at maximum.

As aforementioned, in the construction of hulls according to the prior semitandem system, when a full hull is launched, the stern hull of the next ship must also be afloat so that the work schedules of both hulls should agree with each other at the time of launching. However the time of launching of the full hull and the time when the stern hull of the next ship becomes able to float do not always agree with each other. Accordingly, in order to bring the work schedules of both hulls into agreement the work progress of the full hull must be delayed and that of the stern hull of the next ship must be speeded up or so. This is of course undesirable. According to the present invention, between the construction area of the full hull and that of the stern hull of the next ship there is provided an intermediate gate at all times. This keeps the construction area of the stern hull of the next ship dry at the time of launching of the full hull so that the work schedules in both working areas are not required to agree with each other. Thus construction on work in both areas can proceed freely.

The present invention does not evidently require a dock to be especially longer or wider than prior docks. Only the number of gates is somewhat larger than previously. Moreover the gates of the present invention, especially the intermediate gates, can be effectively utilized for carrying construction material to opposite sides of the dock or other purposes. Accordingly such a dock according to the present invention has evidently no significant difference in construction and construction expenses from docks for hull construction according to the prior semi-tandem system.

In hull construction according to the prior-art semi-tandem system, water must be introduced in the entire dock including the area for the stern hull, at the completion of the full hull, and it must again be drained from the entire dock after the stern hull is moved. On the other hand, a dock according to the present invention is partitioned by its intermediate gate so as to maintain dryness in the area in which the stern hull is being constructed. Therefore the amount of water to be admitted and drained is limited to that required for flooding of the working area containing the completed full hull so that the amount can be much reduced. The entire construction work can evidently be much speeded up as compared with a large dock which takes a long time for drainage.

More concrete construction, characteristics of function and effect of the subject matter of the present invention will be easily understood with reference to explanation of embodiments of the present invention, accompanied by the appended drawings, wherein FIGS. 1a–1e are step by step views showing the working order of hull construction in order by the equipment of the present invention.

FIG. 2 is a plan view showing another embodiment of the equipment of the present invention.

FIGS. 3a–3e are step by step views showing the order of hull construction in prior art hull construction equipment.

Figure 1A:
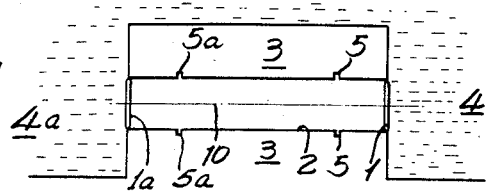

For constructing a hull according to said semi-tandem system, a method the steps of which are analytically shown in FIG. 3, has been adopted in a well known dock with one end facing a water region. Particularly, dock 12 is constructed in dry condition and made a little longer than a hull to be constructed, as shown in FIG. 3a. Gate 11 is provided at one end of the dock, facing the water region. In the greater part of such a dock 12 facing the water region 13, said hull A is constructed with its stern portion facing the water region 13. At the same time, in the portion of the dock 12 remote from the gate 11, stern hull B of the next ship is constructed with its stern portion directed toward the water region 13. When the whole hull A and the stern hull B are both completed, gate 11 is removed as shown in FIG. 3c, thereby introducing water into dock 12 so as to float hulls A and B respectively. Then hulls A and B are moved in the direction of the water region as shown in FIG. 3d. Then gate 11 is set again as shown in the same figure and the water is drained from dock 12. Then the stern hull B which has been moved toward the water region is settled in dock 12. Thus things return to the state shown in FIG. 3b, so as to convert hull B into a full hull, with a new stern hull being begun where hull B was formerly located (FIG. 3e).

To explain now by contrast an embodiment of the present invention with reference to the appended drawings, FIG. 1 shows a construction equipment, namely, dock of the present invention and step by step the states of hull construction works thereby. FIG. 1(a) shows a general plan view of the equipment which forms dock 2 across area 3 with water regions 4, 4a on both sides and provides gates 1, 1a in opposition respectively in position facing water region. Further two groups of gate stops 5, 5 and 5a, 5a of respective intermediate gates are provided in opposition at ample distances from such gates 1a, 1a, enough to form an area for constructing a stern hull as stated hereinafter. To said gate stop 5a of intermediate gate, intermediate gate 6 is provided mountably and dismountably as shown in FIG. 1b and the following. Although two gate stops are provided to intermediate gate 6 as shown, one gate stop suffices generally. Of areas 3, 3 on both sides of dock 2, the one is for supplying hull construction blocks and the other is utilized as storage space of outfits. Further, needless to say, said intermediate gate 6 is portable and appropriately mountable and dismountable to said gate stop 5a, and provides center line 10 to bottom of the dock.

Figure 1B:
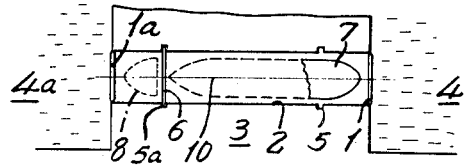
Figure 1C:
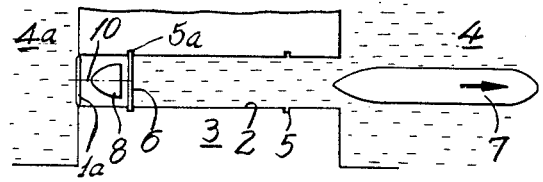
Figure 1D:
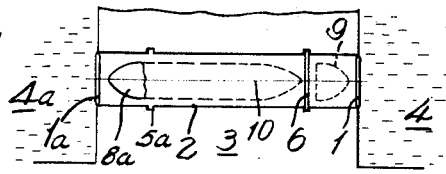
Figure 1E:
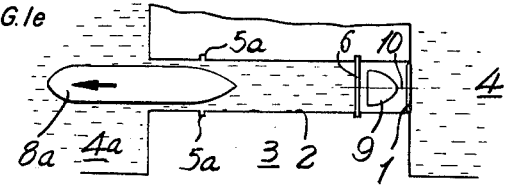

The concrete states of hull construction work in the above equipment of the present invention are shown in order in FIG. 1b and the following. In FIG. 1b gates 1, 1a at the ends of dock 2 are respectively closed and at the same time intermediate gate 6 is mounted to either of gate stops 5a, 5a. A relatively long and wide working area or compartment on one side of intermediate gate 6 and composed of one end portion and the intermediate portion is used for construction of preceding or full hull 7 and a relatively short working area or compartment consisting of the other end portion of the dock is used for construction of stern hull 8 of the next ship. Hull construction work according to the semitandem system, thus carried out is not significantly different from prior hull construction with the exception that the stern sections of both hulls 7, 8 are symmetrically directed toward the respective water region 4, 4a. The top portion of intermediate gate 6 is utilized as passage for trucks and the like. When a preceding hull 7 is completed, end gate 1 is opened, thereby introducing water into the working area containing hull 7 so as to deliver hull 7 into outside water region 4 as shown in FIG. 1c. In such a case the construction area of stern hull 8 is still kept dry by intermediate gate 6 so as to enable the construction of said stern hull 8 to proceed smoothly without hindering launching operations of preceding hull 7. When preceding hull 7 is delivered into outside water region 4, open end gate 1 is closed, water in dock 2 is drained so as to enable to use the dock for construction of hull again. At this time, intermediate gate 6 is moved from the gate stops 5a, 5a to the gate stops 5, 5 as shown in FIG. 5d. Thus the stern hull 8 can be converted in its now enlarged work. So the next ship under construction can utilize the area into a full hull 8a without any need for floating and moving stern hull 8. The area between intermediate gate 6 and closed end gate 1 is further utilized as the construction area for a new stern hull 9. In other words, the work progress relationship shown in FIG. 1b is carried out in reverse relative positions as seen in FIG. 1d. When the hull 8a is thus completed, end gate 1a is opened and the completed hull 8a is delivered into water region 4a, as shown in 1e. Thus, according to the present invention, a completed ship is alternately delivered into opposite water regions 4, 4a. The construction of the stern hull of next ship in a part of dock 2 is also started alternately on opposite sides. So the stern hull thus constructed has no need of being floated and moved at all. The whole hull can be constructed stationarily up to completion.

As compared with construction work according to ordinary semitandem system, the above stated ship building work of the present invention evidently quickens turnover of utilization of dock. In field tests, for instance in case of term of sixty days for ship building in dock, the method of the present invention can reduce this term by two or three days as compared with prior method so that wage and power expense for the reduced period can of course be reduced in full. Further watertight material and towing machines and instruments can also be eliminated.

These features of the present invention are most advantageous for ship building. Further the present invention may be appropriately applied to new ship building as well as to repairing dock.

The present invention is not limited to the above most advantageous method. For instance FIG. 2 shows am embodiment which is suitable in case that a land area 3 in the shape of a peninsula projecting between two water basins is unavailable or that such a projecting area can hardly be constructed or in case of such geographic condition where a projecting area is not wide enough to provide the length of dock, as shown in FIG. 1, if a dock 2 curved in the middle portion is constructed and the above-stated two groups of gate stops 5, 5a are provided in opposition on both sides of curved portion 2′, the ground is shaped such that water region 4 and land area 3 are linear or almost linear. Under such geographical condition which is moreover unchangeable, the equipment of the present invention can be constructed without difficulties and moreover the above stated method of the present invention shown in FIG. 1 can be carried out smoothly without difficulties.

What we claim is:

1. A method of constructing ship hulls of predetermined length, comprising the steps of establishing an elongated enclosure having spaced ends each of which communicates with a body of water but is normally closed; establishing a first partitioning of said enclosure into a first section composed of a first end portion at one of said spaced ends of said enclosure and an intermediate portion, and a second section consisting of a second end portion at the other of said spaced ends of said enclosure; constructing in said first section while the same is composed of said first end portion and said intermediate portion a complete ship's hull of predetermined length, and constructing in said second section while the same consists of said second end portion a part of an other ship's hull; flooding said first section containing said complete ship's hull and floating the latter out of said first section through said one of said spaced ends and into the body of water, and thereafter again closing said one end of said elongated enclosure; evacuating the water from said first section; terminating said first partitioning of said enclosure and establishing a second enclosure and establishing a second partitioning of said enclosure into a third section composed of said second end portion and said intermediate portion of said enclosure and being at least as long as said predetermined length of the ship's hull to be constructed, and a fourth section consisting only of said first end portion; and continuing construction of said other hull in said second section and subsequently in said third section during flooding and subsequent evacuation of said first section, until completion and floating of said other hull out of said third section and into the body of water through said other of said spaced ends.

2. A basin for construction of ship hulls of predetermined length, comprising an elongated enclosure having spaced ends each of which communicates with a body of water, said elongated enclosure having two end portions near each of said spaced ends thereof and an intermediate portion, each of said end portions being shorter than said predetermined length of said ship hulls and each of said end portions together with said intermediate portion being at least as long as said predetermined length; closure means for closing each of said ends of said elongated enclosure independently of the other end whenever required; and partition means adapted to partition said elongated enclosure whenever required between one or the other of said end portions and said intermediate portion, respectively, to thereby provide two compartments one of which consists of one of said end portions and the other of which is composed of said intermediate portion and the other of said end portions so that, when work proceeds on two hulls located in the respective compartments and such work is completed on the hull in said one compartment sooner than on the hull in the other compartment, only said one compartment need be flooded for floating the complete hull out into said body of water without affecting said other compartment and the hull located therein.

3. A basin as defined in claim 2; and further comprising mounting means operative for releasably mounting said partition means in said enclosure in positions in which it s respectvely closer to and farther spaced from one of said ends, whereby to permit increasing the size of one of said compartments while simultaneously decreasing the size of the other compartment, and vice versa.

4. A basin as defined in claim 2, wherein said ends are spaced from one another longitudinally of said enclosure.

5. A basin as defined in claim 3, said enclosure comprising a bottom wall and side walls; said mounting means comprising at least two channels spaced from one another longitudinally of said enclosure and each extending in said bottom wall and side walls and having an open side facing the interior of said enclosure; and said second means comprising a partition element slidably and fluid-tightly receivable in any one of said channels for thereby subdividing the interior of said enclosure into said compartments.

References Cited

UNITED STATES PATENTS 2,245,486   6/1941   Little _____ 61—64

FOREIGN PATENTS 29,289   7/1910   Sweden.
916,815   8/1946   France.

ANDREW H. FARRELL, Primary Examiner

U.S. Cl. X.R.

114—77